US009425625B2

(12) United States Patent
Sander et al.

(10) Patent No.: US 9,425,625 B2
(45) Date of Patent: *Aug. 23, 2016

(54) COORDINATED POWER CONVERTER SYSTEM

(75) Inventors: Sverker Sander, Billdal (SE); Henrik Isaksson, Torslanda (SE); Martin Svensson, Karna (SE)

(73) Assignee: Optis Wireless Technology, LLC, Plano, TX (US)

( * ) Notice: Subject to any disclaimer, the term of this patent is extended or adjusted under 35 U.S.C. 154(b) by 622 days.

This patent is subject to a terminal disclaimer.

(21) Appl. No.: 13/806,122

(22) PCT Filed: Jun. 21, 2010

(86) PCT No.: PCT/EP2010/058734
§ 371 (c)(1),
(2), (4) Date: Dec. 20, 2012

(87) PCT Pub. No.: WO2011/160673
PCT Pub. Date: Dec. 29, 2011

(65) Prior Publication Data
US 2013/0093243 A1 Apr. 18, 2013

(51) Int. Cl.
*H02J 4/00* (2006.01)
*H02M 1/44* (2007.01)
*H02M 3/156* (2006.01)
*H02M 3/157* (2006.01)

(52) U.S. Cl.
CPC ............ *H02J 4/00* (2013.01); *H02M 1/44* (2013.01); *H02M 3/156* (2013.01); *H02M 3/157* (2013.01); *Y10T 307/406* (2015.04)

(58) Field of Classification Search
CPC ........... H02J 4/00; H02M 1/44; H02M 3/156
USPC ........................................................ 307/31
See application file for complete search history.

(56) References Cited

U.S. PATENT DOCUMENTS

| 4,188,585 | A | 2/1980 | Wissel et al. | |
|---|---|---|---|---|
| 6,366,067 | B1 | 4/2002 | Zhang et al. | |
| 2003/0081653 | A1 | 5/2003 | Hardin et al. | |
| 2004/0114550 | A1 | 6/2004 | Wei et al. | |
| 2004/0201281 | A1* | 10/2004 | Ma et al. | 307/38 |
| 2007/0010917 | A1 | 1/2007 | Masson et al. | |
| 2010/0141233 | A1 | 6/2010 | Kwok | |
| 2011/0049986 | A1* | 3/2011 | Edelson et al. | 307/31 |

FOREIGN PATENT DOCUMENTS

DE   10 2008 053 670 A1   5/2010
WO        2010044017 A1   4/2010

OTHER PUBLICATIONS

Maxim Integrated, Application Note 1077 DC-to-DC Converter Combats EMI, May 2002.*

* cited by examiner

*Primary Examiner* — Scott Bauer

(57) ABSTRACT

The present invention relates to a switched power converter system (1), comprising at least a first power converter (2) and a second power converter (3). Each power converter (2, 3) has a corresponding input terminal (4a, 5a) and output terminal (4b, 5b), where each power converter (2, 3) comprises a corresponding switch arrangement (6, 7). The system further comprises a control unit (8) that at least at start-up is connected to each power converter (2, 3) in the system (1) and arranged to control each switch arrangement (6, 7) by means of spread spectrum modulation, such that cross correlation between the conducted or radiated emissions of the switch arrangements (6, 7) is avoided.

6 Claims, 4 Drawing Sheets

COORDINATED POWER CONVERTER SYSTEM

CROSS REFERENCE TO RELATED APPLICATIONS

This application is a 35 U.S.C. §371 National Phase Entry Application from PCT/EP2010/058734, filed Jun. 21, 2010, designating the United States, the disclosure of which is incorporated herein in its entirety by reference.

TECHNICAL FIELD

The present invention relates to a switched power converter system comprising at least a first power converter and a second power converter. Each power converter has a corresponding input terminal and output terminal, where each power converter comprises a corresponding switch arrangement.

BACKGROUND

Switched power converters are used in many areas of technology, where it is desired to acquire a certain voltage. Many power converters may be used in order to obtain a plurality of desired voltages, for example on a circuit board with different power consuming devices.

However, when a plurality of power converters is used, there is a problem regarding the switches, where a plurality of switches may switch at more or less the same time, causing electromagnetic interference.

One way to counteract this problem is to synchronize the switches of the power converters and introduce a phase shift.

However, it is not always possible to synchronize the switch frequencies of multiple power converters since they will meet different design constraints, e.g. output filter component size. Furthermore, it is difficult to introduce a phase shift for a large number of power converters since the phase displacements will be very small and impractical.

There is thus a desire for avoiding the problem where a number of switches in a plurality of switch power converters cause electromagnetic interference (EMI) due to switching timing.

SUMMARY

The object of the present invention is to avoid the problem where a number of switches in a plurality of switch power converters cause electromagnetic interference due to switching timing.

This object is obtained by means of a switched power converter system comprising at least a first power converter and a second power converter. Each power converter has a corresponding input terminal and output terminal, where each power converter comprises a corresponding switch arrangement. The system further comprises a control unit that at least at start-up is connected to each power converter in the system and arranged to control each switch arrangement by means of spread spectrum modulation, such that cross correlation between the conducted or radiated emissions of the switch arrangements is avoided.

According to an example, each switch arrangement is controlled by the control unit such that:

its switch frequency is spread spectrum frequency modulated, SSFM, by means of a random code, where the random code is controlled to avoid cross correlation between the switch arrangements, and/or the pulse widths of the pulses that control the switch arrangements are spread spectrum modulated by means of a random code, where the random code is controlled to avoid cross correlation between the switch arrangements.

According to another example, each switch arrangement is controlled by the control unit such that the pulse widths and/or the switch frequencies are spread spectrum modulated simultaneously by means of a random code, where the random code is controlled to avoid cross correlation between the switch arrangements. The random codes may for example be in the form of pseudo random bit sequences, PRBS, with cross correlation requirements.

Each power converter may be one of a step-up or step-down DC/DC, DC/AC, AC/DC or AC/AC converter, being non-isolated or having primary and secondary side galvanic isolated from each other.

A number of advantages are obtained by means of the present invention. For example:

The power converter system's total Conducted Emission (CE) and Radiated Emission (RE) may be decreased by continuously updating and coordinating each power converter's momentarily and long time spectral contents.

A control unit may, on demand or at change of power system configurations, distribute minimum cross correlated codes with respect to certain sensible frequency bands to decrease CE/RE.

The gained headroom may consequently be used to alternatively allow more output power without exceeding Electromagnetic Compatibility (EMC) requirements or decrease component size of common or individually dedicated filters.

BRIEF DESCRIPTION OF THE DRAWINGS

The present invention will now be described more in detail with reference to the appended drawings, where.

DETAILED DESCRIPTION

Figure 1:
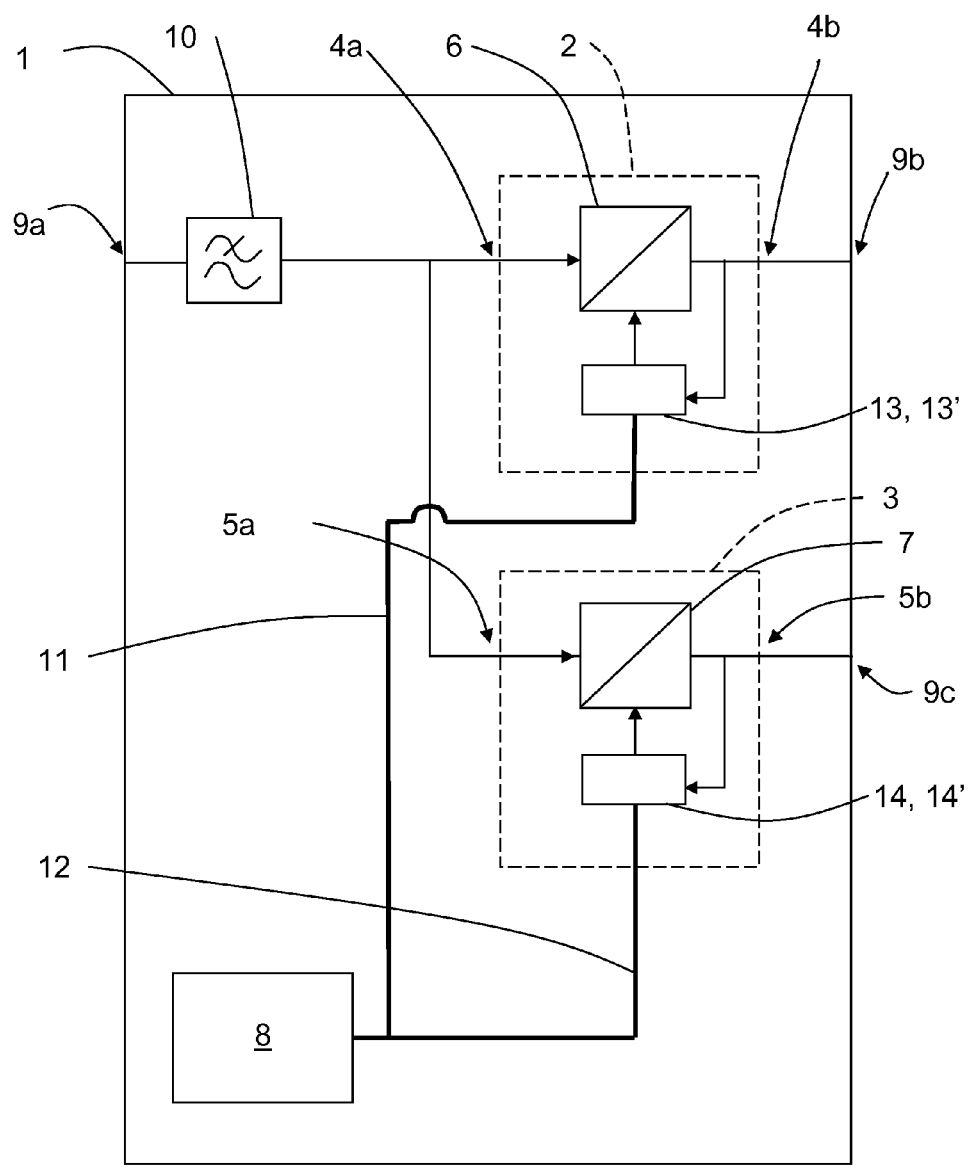
FIG. 1 shows a simplified schematic of a power converter system according to the present invention.

With reference to FIG. 1, there is a switched power converter system 1 comprising a first power converter 2 and a second power converter 3, the first power converter 2 having a first input terminal 4a and first output terminal 4b, and the second power converter 2 having a second input terminal 5a and second output terminal 5b. The first power converter 2 comprises a first switch arrangement 6, and the second power converter 3 comprises a second switch arrangement 7.

The power converter system 1 comprises an input connection 9a that is connected to the first input terminal 4a and the second input terminal 5a via an input filter 10. The power converter system 1 also comprises two output connections 9b and 9c.

According to the present invention, the system 1 further comprises a control unit 8 that is connected to the first power converter 2 via a first data bus 11 and the second power converter 3 via a second data bus 12. The first data bus is connected to a first pulse module 13 comprised in the first power converter 2, and the second data bus 12 is connected to a second pulse module 14 comprised in the second power converter 3.

The control unit 8 arranged to control the switch arrangements 6, 7 by means of spread spectrum modulation, such that cross correlation between the conducted or radiated emissions of the switch arrangements 6, 7 is avoided.

Figure 2:
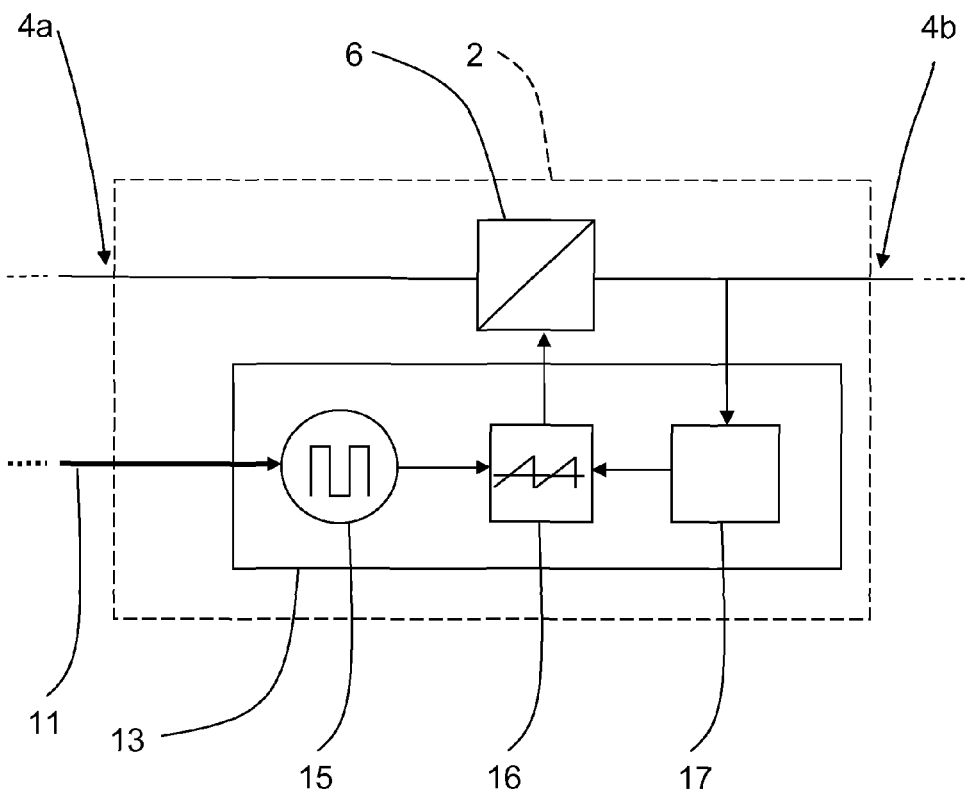
FIG. 2 shows a more detailed schematic of a first example of a part of the power converter system according to the present invention.

With reference to both FIG. 1 and FIG. 2, FIG. 2 showing more details of a first version of the first pulse module 13, a first example will be discussed. It is to be understood that the second power converter 3 has the same configuration as the first power converter 2, the first pulse module 13 and the second pulse module 14 having the same configurations although only the first pulse module 13 will be described.

The first version of the first pulse module 13 comprises an oscillator 15, a pulse width modulator (PWM) 16 and a feed-back unit 17, where the first data bus 11 is connected to the oscillator 15, which in turn is connected to the PWM 16, controlling the pulse frequency, where the PWM 16 in turn is connected to the first switch arrangement 6, controlling the switching of the first switch arrangement 6. The output of the first switch arrangement is fed to the first output terminal 4b, where also the output voltage of the first switch arrangement 6 is fed back to the feed-back unit 17.

The feed-back unit 17 is arranged to check the output voltage, and controls the PWM 16 such that the desired output voltage is obtained by changing the pulse widths.

The PWM 16 is thus controlled by the feed-back unit 17 such that a desired output voltage is obtained by means of its pulse widths. Furthermore, in accordance with the present invention, the PWM 16 is controlled by the control unit 8 such that the switch frequency of the first switch arrangement 6 is spread spectrum frequency modulated (SSFM) by means of a random code. In the same way, in the second power converter 3, the switch frequency of the second switch arrangement 7 is spread spectrum frequency modulated by means of a random code. The random codes are controlled to avoid cross correlation between the switch arrangements 6, 7.

In this way, the switch arrangements 6, 7 are bound to not use the same pulse frequency simultaneously, thus decreasing the momentarily CE/RE spectrum peaks in the power system 1. It will further decrease the long time average CE/RE spectrum spuriouses that would be present in the power system 1 if arbitrary PRBS codes, without cross correlation minimization, would be used.

Generally, with reference to the first example, the total CE/RE amplitude spectrum may be decreased by modulating the oscillator's clock frequencies, of all power converters, in a power system with minimum cross correlated pseudo random bit sequences (PRBS) codes. This may be achieved with Hadamard-Walsh, Gold-codes or other suitable codes.

Allocation of codes to each power converter is determined by the control unit 8. The codes may be altered depending of the number of converters in the system or other parameters like each converter's input power.

Figure 3:
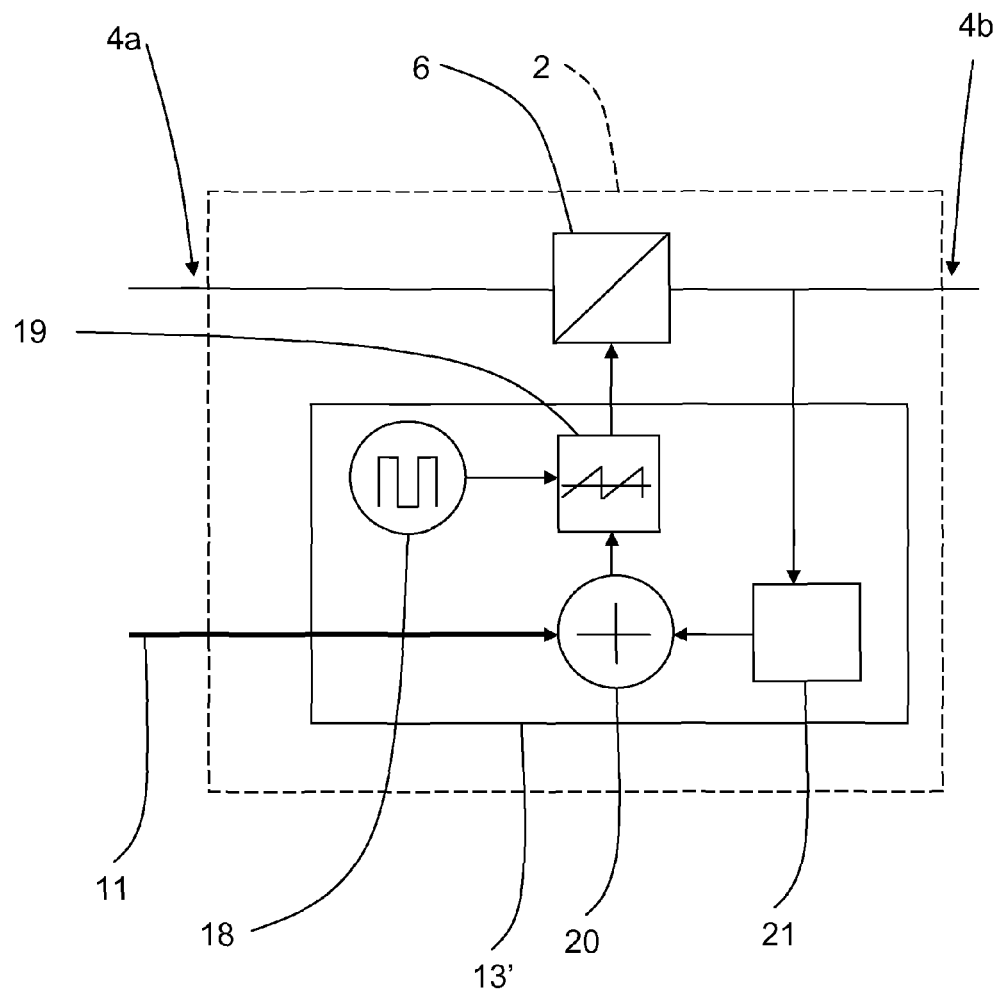
FIG. 3 shows a more detailed schematic of a second example of a part of the power converter system according to the present invention.

With reference to both FIG. 1 and FIG. 3, FIG. 3 showing more details of a second version of the first pulse module 13', a second example will be discussed. In the same way as in the first example, it is to be understood that the second power converter 3 has the same configuration as the first power converter 2, the first pulse module 13' and the second pulse module 14' having the same configurations although only the first pulse module 13' will be described.

The second version of the first pulse module 13' comprises an oscillator 18, a PWM 19, an adder 20 and a feed-back unit 21, where the first data bus 11 is connected to the adder 20. The feed-back unit 21 is also connected to the adder 20, where the output of the adder 20 is connected to the PWM 19, where the PWM 19 in turn is connected to the first switch arrangement 6, controlling the pulse width of the first switch arrangement 6. The output of the first switch arrangement 6 is fed to the first output terminal 4b, where also the voltage output of the first switch arrangement 6 is fed back to the feed-back unit 21.

The feed-back unit 21 is arranged to check the output voltage, and controls the PWM 19 such that the desired output voltage is obtained by changing the pulse widths.

The PWM 19 is thus controlled by the feed-back unit 21 such that a desired output voltage is obtained by means of its pulse widths. Furthermore, in accordance with the present invention, the PWM 19 is controlled by the control unit 8 such that the pulse widths of the pulses that control the first switch arrangements 6 are spread spectrum modulated by means of a random code. In the same way, in the second power converter 3, the pulse widths of the second switch arrangement 7 are spread spectrum frequency modulated by means of a random code. The random codes are controlled to avoid cross correlation between the switch arrangements 6, 7.

In this way, the switch arrangements 6, 7 are bound to not use the same temporarily pulse width lengthening or shortening simultaneously, thus decreasing the momentarily CE/RE spectrum peaks in the power system 1. It will further decrease the long time average CE/RE spectrum spuriouses that would be present in the power system 1 if arbitrary PRBS codes, without cross correlation minimization, would be used.

Generally, with reference to the second example, the total CE/RE amplitude spectrum may be decreased by modulating the pulse width, of all power converters, in a power system with minimum cross correlated PRBS codes. This may be achieved with Hadamard-Walsh, Gold-codes or other suitable codes.

Allocation of codes to each power converter is determined by the control unit 8. The codes may be altered depending of the number of converters in the system or other parameters like each converter's input power.

It is of course conceivable that the two examples are combined, such that in FIG. 3, the first data bus 11 also is connected to the oscillator 18 and thus controls both the pulse width and the switch frequency such that cross correlation between the switch arrangements 6, 7 is avoided. Such a combination may be performed in many ways; the connection of the first data bus 11 to both the adder 20 and the oscillator 18 is only an example.

Figure 4:
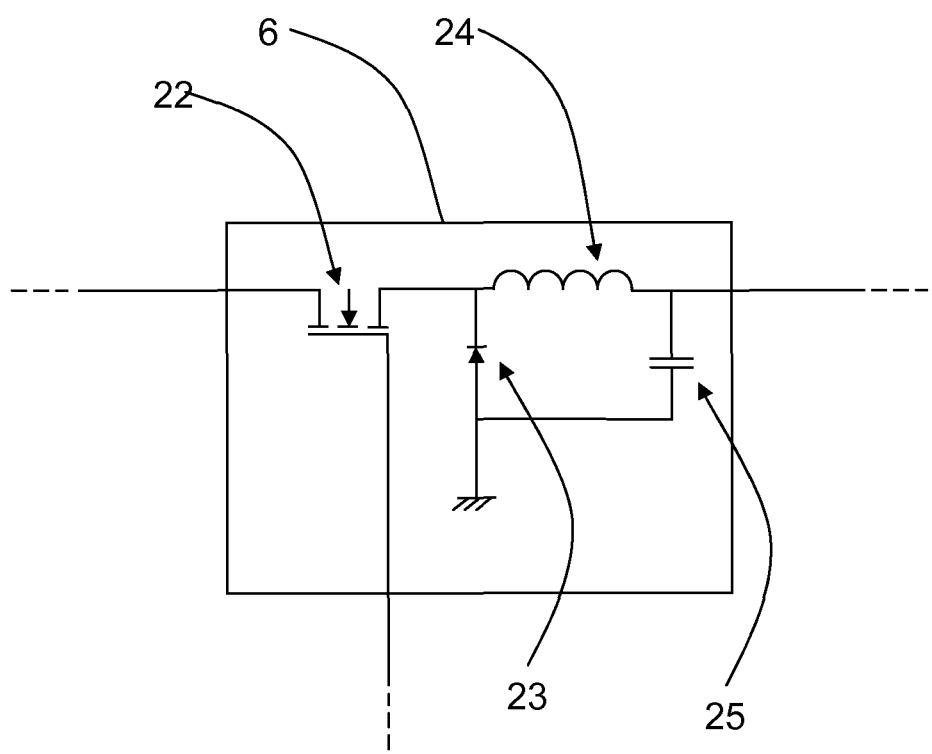
FIG. 4 shows a more detailed schematic of an example of a switch arrangement in the power converter system according to the present invention.

With reference to FIG. 4, the detailed schematics of an example of the first switch arrangement 6 is shown. It is to be understood that the second power converter 3 may have the same configuration as the first power converter 2, and thus that the second switch arrangement 7 may have the same configuration as the first switch arrangement 6. The power converters 2, 3 may further be of the same or different types, where the types for example may be step-up or step-down DC/DC, DC/AC, AC/DC or AC/AC converters, realized as a non-isolated or transformer isolated power converters.

The first switch arrangement 6, also known as a buck converter, comprises a switch transistor 22, a diode 23, an inductor 24, and a capacitor 25. The switch transistor 22 is connected to the first input terminal 4a, the inductor 24, the diode 23 and the PWM 16, 19 of the first pulse module 13, 13'. The pulses from the PWM 16, 19 control the switch transistor 22 such that is either open or closed between the first input terminal 4a and the inductor 24. The switch transistor 22 and the inductor 24 are connected to ground via the diode 23, and the inductor 24 is further connected to the first output terminal 4b, where the inductor 24 and the first output terminal 4b are connected to ground via the capacitor 25.

The present invention is not limited to the description above, but may vary within the scope of the appended claims. For example, the detailed description of the switch arrangement 6 is only an example of a typical switch arrangement. A switch arrangement that is suitable for use in the present invention may be made in many other ways, comprises other types of components.

The random codes may be any suitable random code, for example in the form of the mentioned PRBS.

In the shown example of a system where the present invention is used, two power converters are shown. Of course, the present invention is applicable for any number of power converters is a system, the number being at least two.

The details of the power converters and the parts comprised in them are only provided as an example, for example the pulse modules may have any other suitable configuration, and the adder 20 may be any type of combining means. The main feature of the present invention is to control the switch arrangements 6, 7 in at least two separate power converters 2, 3 in a coordinated manner such that cross correlation between the switch arrangements 6, 7 is avoided. This is achieved by means of either controlling the switch frequency, the pulse width, or both.

This means that the total conducted and radiated emission may be decreased, in an electrically or electromagnetically connected power system, by configuring and coordinating all power converters via a data bus with minimum cross correlated PRBS codes.

The minimum cross correlated codes may be used to modulate each power converter's switch frequency, pulse width or switch frequency and pulse width simultaneously.

The control unit 8 may be constituted by any type of microcomputer, microcontroller or other digital circuit such as a FPGA or a digital logic net, either remotely or locally installed.

The invention claimed is:

1. A switched power converter system, comprising:
at least a first power converter and a second power converter, the first power converter comprising a first input terminal, a first output terminal, and a first switch arrangement, the second power converter comprising a second input terminal, a second output terminal, and a second switch arrangement and
a control unit that, at least at start-up, is connected to the first power converter and the second power converter, and sends a first pseudo-random code sequence to the first power converter and a second pseudo-random code sequence to the second power converter, the first pseudo-random code sequence being configured to avoid cross correlation with the second pseudo-random code sequence.

2. A switched power converter system according to claim 1, wherein the first switch arrangement and the second switch arrangement are controlled by the control unit such that a switch frequency of the first switch arrangement is spread spectrum frequency modulated, SSFM, by using the first pseudo-random code and a switch frequency of the second switch arrangement is spread spectrum frequency modulated, SSFM, by using the second pseudo-random code.

3. A switched power converter system according to claim 1, wherein the first switch arrangement and the second switch arrangement are controlled by the control unit such that pulse widths of pulses that control the first switch arrangements are spread spectrum modulated by using the first pseudo-random code and pulse widths of pulses that control the second switch arrangement are spread spectrum modulated by using the second pseudo-random code.

4. A switched power converter system according to claim 1, wherein the first switch arrangement and the second switch arrangement are controlled by the control unit such that pulse widths and switch frequencies of the first switch arrangement are spread spectrum modulated simultaneously by using the first pseudo-random code and pulse widths and switch frequencies of the second switch arrangement are spread spectrum modulated simultaneously by using the second pseudo-random code.

5. A switched power converter system according to claim 1, wherein the first pseudo-random code and the second pseudo-random code are pseudo-random bit sequences, PRBS, with cross correlation requirements.

6. A switched power converter system according to claim 1, wherein each power converter is one of a step-up or stepdown DC/DC, DC/AC, AC/DC or AC/AC converter, being non-isolated or having primary and secondary side galvanic isolated from each other.

* * * * *